US007992191B2

(12) United States Patent
DeJana et al.

(10) Patent No.: US 7,992,191 B2
(45) Date of Patent: Aug. 2, 2011

(54) SYSTEM AND METHOD FOR CONTROLLING A WEBSPHERE PORTAL WITHOUT THE REQUIREMENT OF HAVING THE ADMINISTRATOR CREDENTIAL ID AND PASSWORD

(75) Inventors: Ryan G. DeJana, Longmont, CO (US); Jesus I. Portilla, Erie, CO (US)

(73) Assignee: International Business Machines Corporation, Armonk, NY (US)

( * ) Notice: Subject to any disclaimer, the term of this patent is extended or adjusted under 35 U.S.C. 154(b) by 678 days.

(21) Appl. No.: 12/054,635

(22) Filed: Mar. 25, 2008

(65) Prior Publication Data

US 2009/0249450 A1 Oct. 1, 2009

(51) Int. Cl.
*H04L 9/32* (2006.01)
(52) U.S. Cl. ..................................... 726/2; 726/4; 726/5
(58) Field of Classification Search .................. 726/2–7, 726/16–21; 713/168, 183, 193–194
See application file for complete search history.

(56) References Cited

U.S. PATENT DOCUMENTS

| 7,092,942 | B2 | 8/2006 | Frieden et al. |
| 7,190,960 | B2 * | 3/2007 | Wilson et al. ............... 455/456.1 |
| 7,600,027 | B2 * | 10/2009 | Yan ................................ 709/227 |
| 2003/0084288 | A1 | 5/2003 | de Jong et al. |
| 2003/0115292 | A1 | 6/2003 | Griffin et al. |
| 2003/0149583 | A1 | 8/2003 | Ergezinger et al. |
| 2006/0064502 | A1 | 3/2006 | Nagarajayya |

* cited by examiner

*Primary Examiner* — Hosuk Song
(74) *Attorney, Agent, or Firm* — William Schiesser; Hoffman Warnick LLC

(57) ABSTRACT

A system and method for securely controlling (e.g., "starting" and "stopping") a WebSphere Portal (WP) in a production environment without the requirement of having knowledge of (and using) the administrator credentials (ID and password). The system and method, as implemented in a Java application, receives from requesting users and determines whether the requesting users are authorized to control (start/stop) the portal by comparing each requesting user's ID and PW against a list of authorized user IDs and PWs and, if there is a match, passing on the authorized user ID and PW to the portal for controlling (starting/stopping) the WebSphere Portal. The system and method further conveys portal control request authorized user acceptances or portal control request unauthorized user rejections—depending upon whether the requesting user's ID and PW matches any of the list of authorized user IDs and PWs.

18 Claims, 5 Drawing Sheets

Figure 1 – Illustrative computer system

Figure 2 – Illustrative communication network

SYSTEM AND METHOD FOR CONTROLLING A WEBSPHERE PORTAL WITHOUT THE REQUIREMENT OF HAVING THE ADMINISTRATOR CREDENTIAL ID AND PASSWORD

BACKGROUND OF THE INVENTION

1. Field of the Invention

The present invention generally relates to the IBM® WebSphere® Portal and, specifically, the present invention provides a system and method for controlling (e.g., starting and stopping) the IBM WebSphere Portal (WP) without the requirement of having knowledge of the administrator credential ID and password (PW).

2. Related Art

WebSphere refers to a brand of IBM software products which helped define the middleware software category and is designed to set up, operate and integrate e-business applications across multiple computing platforms using Web technologies. It includes both the run-time components (like WebSphere Application Server (WAS)) and the tools to develop applications that will run on WAS. The IBM WebSphere Portal provides personalized access to a variety of applications and aggregate disparate content sources and services. Portals allow people to customize their user experience, with personalized applications based on role, context, actions, location, preferences and team collaboration needs. There are many other things that can be brought into a portal site. Web portals allow partners, employees and customers to choose their user experience, with personalized applications based on role, context, actions, location, preferences and team collaboration needs. IBM WebSphere Portal software provides a composite application or business mashup framework and the advanced tooling needed to build flexible, SOA-based solutions, as well as the unmatched scalability required by any size organization.

There are some known ways to start and stop WebSphere Portal (WP). For instance:
1. via commands on the Command Line Interface (CLI) on a session shell;
2. on the administrator console (admin console) via a web browser; and
3. with a WP configuration task.

For more information, see http://publib.boulder.ibm.com/infocenter/wpdoc/v6r0/index.jsp?topic=/com.ibm.wp.ent.doc/wpf/inst_startstop.html.

Each of these require knowledge of the administrator credential identification (ID) and password. This requirement is necessary in the prior art as the ability to start and stop the WP needs to be secure, that is, only authorized persons are allowed to start and stop the WP. However, this is a problem if the administrator credential ID and password are not known to the person with operator role wishing to start or stop the WP.

Existing portals have an existing interface which is configured to respond to only one user ID (and password) to control the portal, i.e., start and stop the portal. In this way, controlling the portal is secure. However, as discussed above, it is very limited in its usage due to the above requirements. If the person who owns those credentials is not available, there is no way for another person not having those credentials to start and stop WP. These tasks are very critical during deployment and maintenance windows. Additionally, if those credentials get stolen or lost, the whole production environment becomes vulnerable and is exposed to a great risk of security attacks. In addition, it can cause delays in that maintenance or deployment procedures may not be able to be performed in a timely manner causing inefficiencies.

As such, a new secure system and method are necessary to allow a person to start and stop the WebSphere Portal (WP) without the requirement of having knowledge of the administrator credential ID and password as described above.

SUMMARY OF THE INVENTION

The system and method of the present invention provide a secure manner to start and stop WebSphere Portal (WP) on a production environment without the requirement of having knowledge of (and using) the administrator credentials (ID and password).

The system and method, as implemented in a Java application, receives input from requesting users and determines whether the requesting users are authorized to control (start/stop) the portal by comparing each requesting user's ID and PW against a list of authorized user IDs and PWs and, if there is a match, passing on the authorized user ID and PW to the portal for controlling (starting/stopping) the WebSphere portal. The system and method further conveys acceptances of user requests for portal control or rejections of user requests for portal control—depending upon whether the requesting user's ID and PW match any of the list of authorized user IDs and PWs.

BRIEF DESCRIPTION OF THE DRAWINGS

These and other features of this invention will be more readily understood from the following detailed description of the various aspects of the invention taken in conjunction with the accompanying drawings in which.

Figure 1:
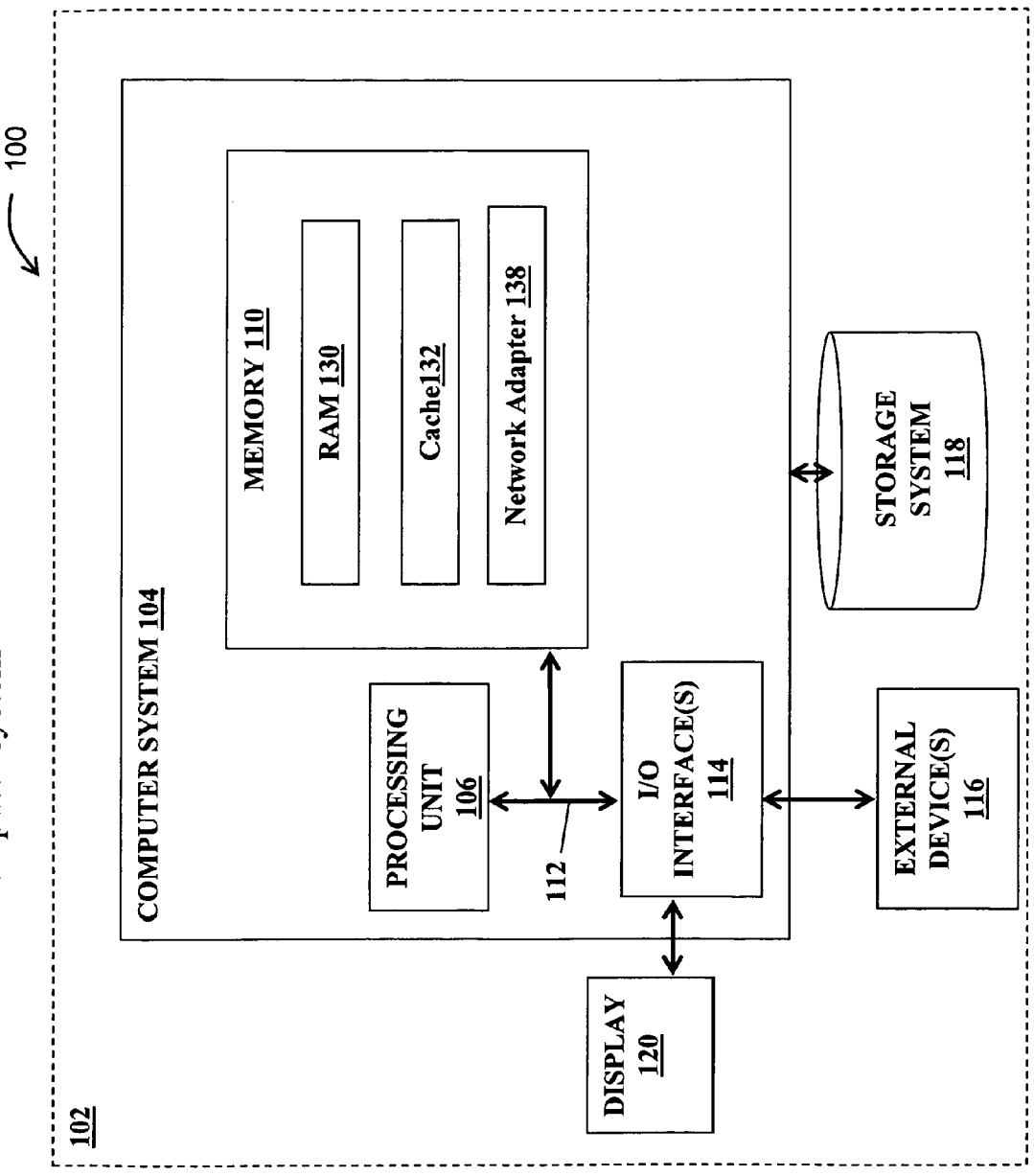
FIG. 1 shows a system suitable for storing and/or executing program code, such as the program code of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE PREFERRED EMBODIMENT

The system and method of the present invention utilizes a Java-based application which encrypts the administration ID and password. It provides a proxy or entry point to call WP administration tasks. Details are shown in the figures to be discussed below.

According to the present invention, there is a Java code interface "in front of" the existing portal interface. The Java code interface is configured to recognize multiple valid user IDs (and respective passwords) as authorized to control the portal. When any user ID makes a control request to the Java code interface, the Java code interface determines if the user ID (and password) are authorized based on the configuration of the Java code interface, and if so, outputs to the existing portal interface the one user ID for which the existing portal interface is configured to recognize as authorized.

As a matter of background, a description of a data processing system in which the method and system of the present may be implemented is provided. A data processing system, such as that system 100 shown in FIG. 1, suitable for storing and/or executing program code (such as the code of the present invention) will include at least one processor (processing unit 106) coupled directly or indirectly to memory elements through a system bus. The memory elements can include local memory (RAM 130) employed during actual execution of the program code, bulk storage (storage 118), and cache memories (cache 132) which provide temporary storage of at least some program code in order to reduce the number of times code must be retrieved from bulk storage during execution. Input/output or I/O devices (external devices 116) (including but not limited to keyboards, displays, pointing devices, etc.) can be coupled to the system either directly or through intervening I/O controllers (I/O Interface 114).

Figure 2:
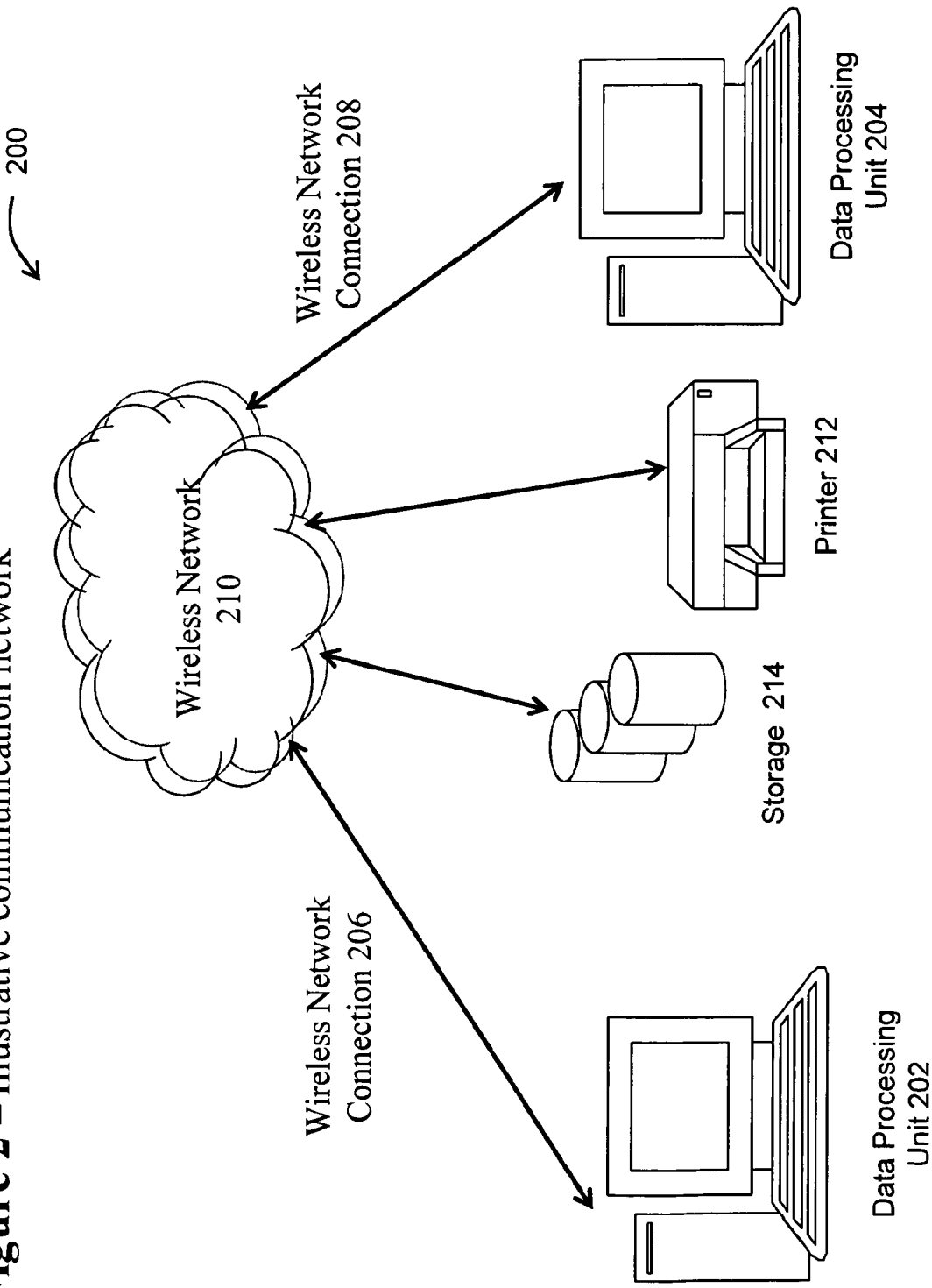
FIG. 2 shows an illustrative communication network for implementing an embodiment of method of the present invention.

Network adapters (network adapter 138) may also be coupled to the system to enable the data processing system (as shown in FIG. 2, data processing unit 202) to become coupled to other data processing systems (data processing unit 204) or remote printers (printer 212) or storage devices (storage 214) through intervening private or public networks (network 210). (A computer network is composed of multiple computers connected together using a telecommunication system for the purpose of sharing data, resources and communication. For more information, see http://historyoftheinternet.org/). Modems, cable modem and Ethernet cards are just a few of the currently available types of network adapters. (A network card, network adapter or NIC (network interface card) is a piece of computer hardware designed to allow computers to communicate over a computer network. It is both an OSI layer 1 (physical layer) and layer 2 (data link layer) device, as it provides physical access to a networking medium and provides a low-level addressing system through the use of MAC addresses. It allows users to connect to each other either by using cables or wirelessly.)

Java is a programming language originally developed by Sun Microsystems and released in 1995 as a core component of Sun's Java platform. The language derives much of its syntax from C and C++ but has a simpler object model and fewer low-level facilities. Java applications are typically compiled to bytecode which can run on any Java virtual machine (JVM) regardless of computer architecture.

As noted above, one embodiment of the system and method of the present invention utilizes a Java-based application which encrypts the administration ID and password. (It should be noted that any fourth generation programming language (also known as 4GL) may be used as well. A 4GL is a higher-level programming language that automates many of the basic functions that must be spelled out in conventional languages, and can obtain results with an order-of-magnitude less coding because of its richer content of commands. It is a computer language that is more advanced than traditional high-level programming languages.) The application provides a proxy or entry point to call WP administration tasks. Details are shown in the figures to be discussed below.

Figure 3:
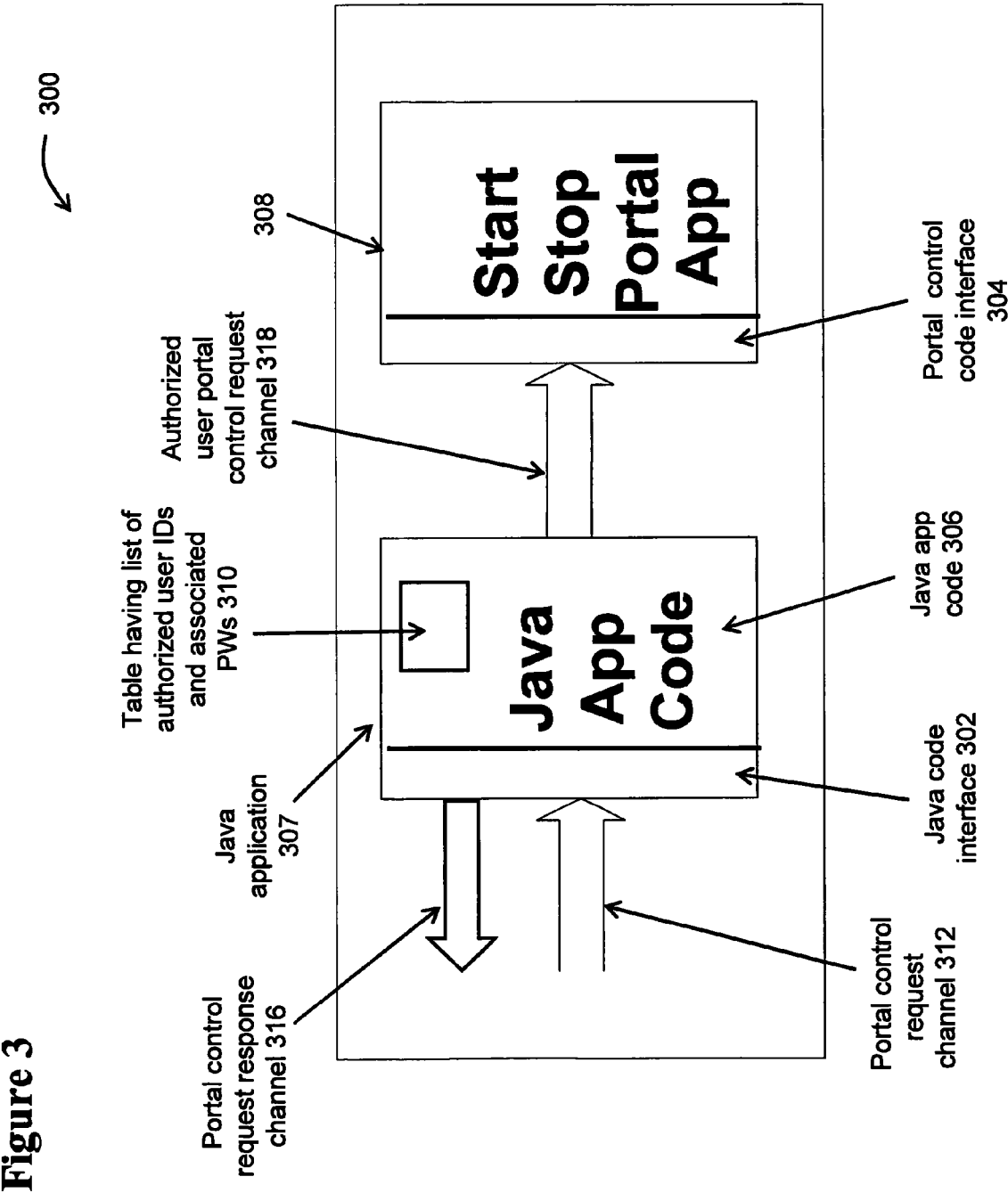
FIG. 3 shows a diagram illustrating an embodiment of the system of the present invention.

According to the present invention and as is shown in FIG. 3, a Java application 307 has a Java code interface 302 "in front of" the Java application code 306, the existing portal interface 304 and the existing portal control application code 308. The Java code interface 302 provides an interface to the Java application code 306 which is configured to recognize multiple valid user IDs (and respective passwords) as authorized to control the portal. When any user ID makes a control request via Portal control request channel 312 to the Java code interface 302, the Java code interface 302 passes the request to the Java application code 306 which determines if the requesting user ID (and password) are authorized by comparing the requesting user ID and password against a list of authorized user IDs and associated passwords in table 310. If the requesting user ID and password match one of user IDs and passwords in the list of authorized user IDs and associated passwords in table 310, the Java application code 306 outputs, via authorized user portal control request channel 318, to the existing portal control code interface 304, the user ID for which the existing portal interface 304 is configured to recognize as authorized. The existing portal control code interface 304 passes this on to the Java application code 306 for processing as an authorized user. Concurrently, the Java application code 306 outputs, via the Java code interface 302 and the portal control request response channel 316, to the requesting user, an authorized user response indicating to the user that the request has been accepted. If the requesting user ID and password do not match one of user IDs and passwords in the list of authorized user IDs and associated passwords in table 310, the Java application code 306 outputs, via the Java code interface 302 and the Portal control request response channel 316, to the requesting user, an unauthorized user response indicating to the user that the request has been rejected.

Figure 4:
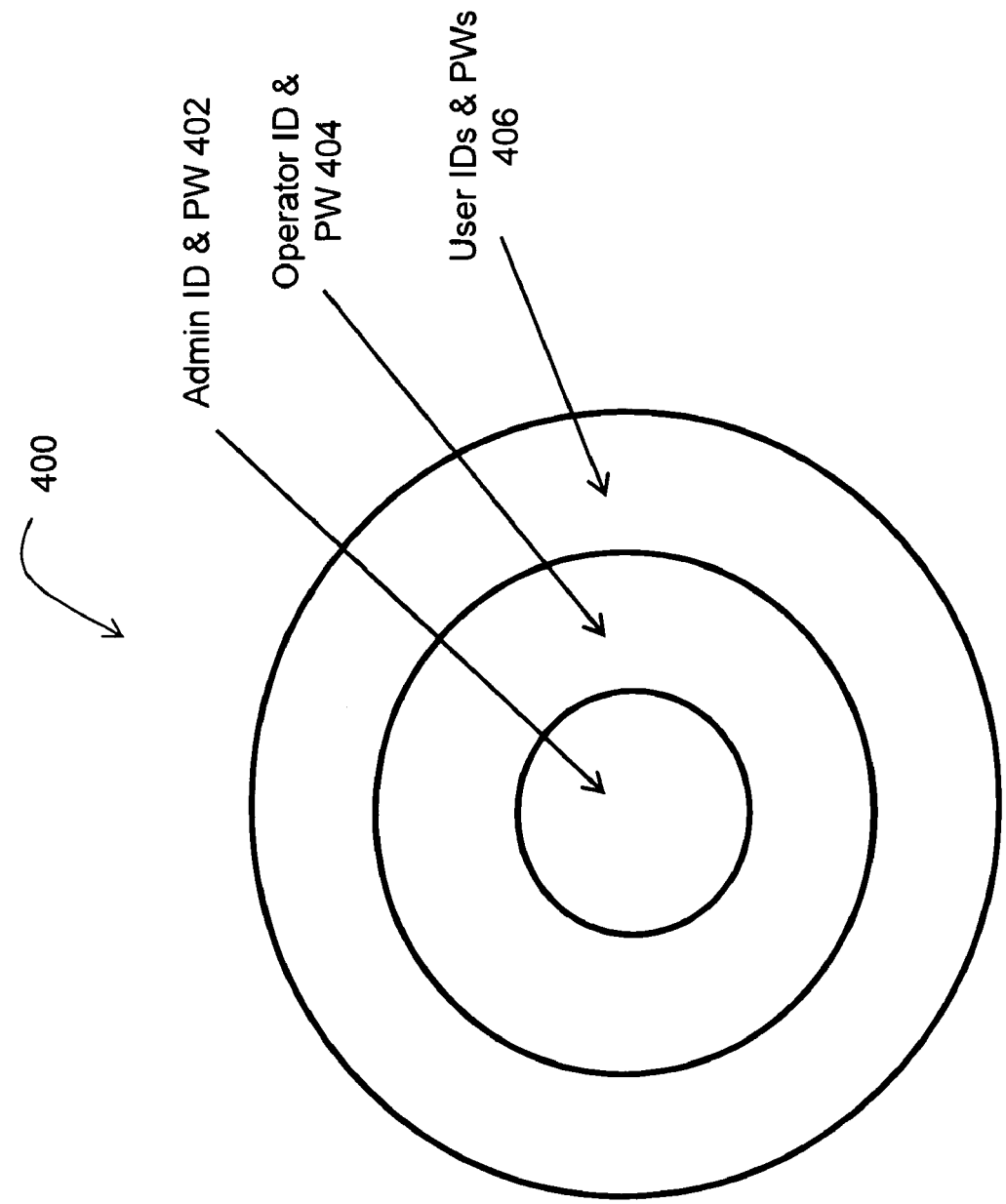
FIG. 4 shows a diagram illustrating another embodiment of the system of the present invention including illustrating different types of roles.

This is shown in FIG. 4 as well. The Java code interface 302 recognizes, from User IDs and PWs 406, multiple valid user IDs (and respective passwords) 404 as authorized to control the portal. When any user ID makes a control request to the Java code interface 302, the Java code interface determines if the user ID (and password) are authorized based on the configuration of the Java code interface 302, and if so, outputs, to the existing portal interface 304, the one user ID 404 for which the existing portal interface 304 is configured to recognize as authorized.

Figure 5:
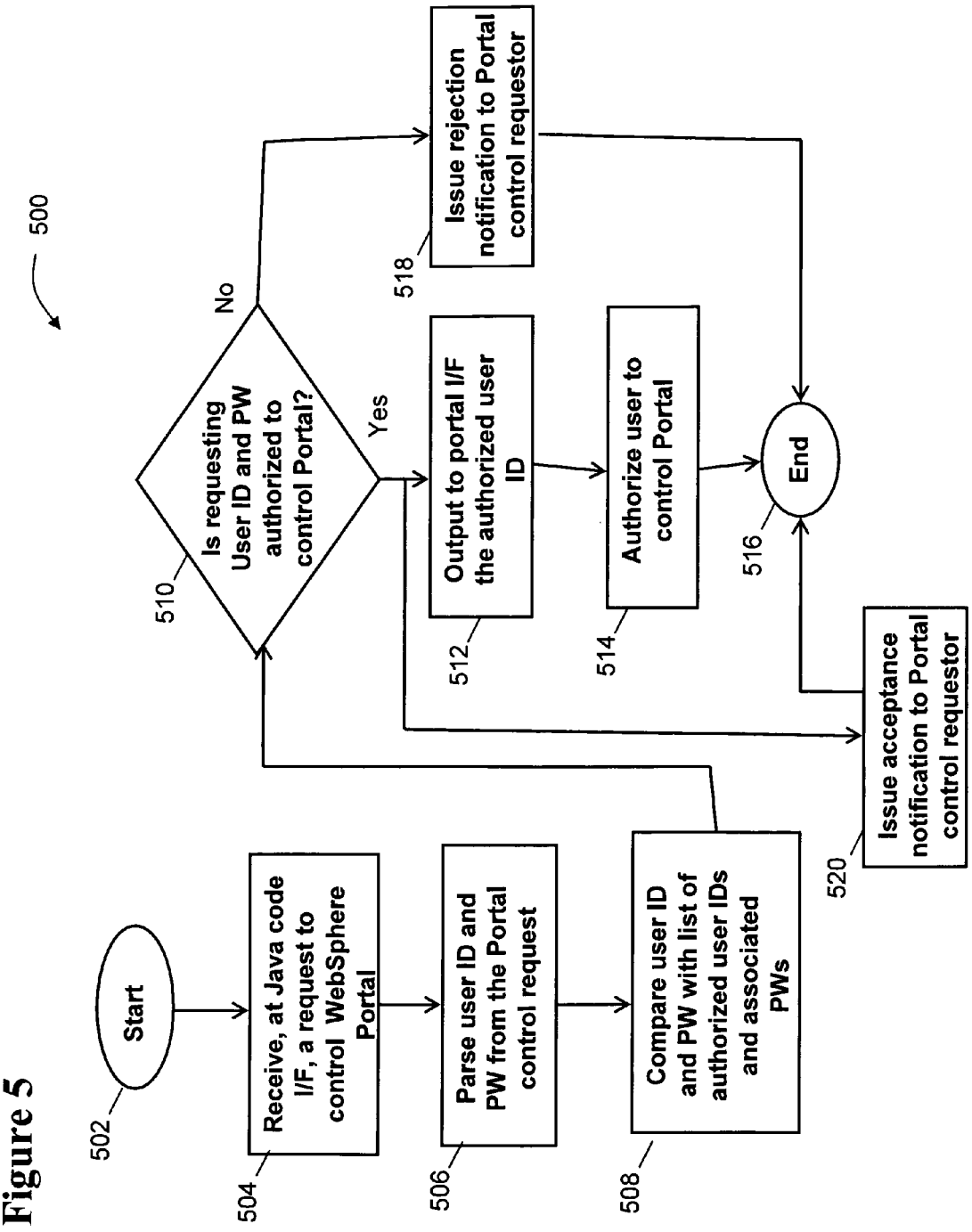
FIG. 5 shows a block diagram illustrating the preferred embodiment of the method of the present invention.

FIG. 5 illustrates a block diagram of the method 500 of the present invention which starts at 502. At 504, a request to control the WebSphere Portal is received at the Java code interface. At 506, the Portal control request is parsed by the Java application code to obtain the user ID and PW of the requesting party. At 508, the Java application code compares the requesting user ID and PW with a list of user IDs and associated PWs which are authorized to control the WebSphere Portal. At 510, it is determined whether the requesting user ID and associated PW is authorized to control the WebSphere Portal. If not, at 518, an unauthorized user rejection notification is conveyed to the requesting user and the method ends at 516. If so, the authorized user ID and PW are conveyed to the WebSphere Portal I/F and, at 514, the requesting user is authorized to control Portal, while, concurrently, at 520, an authorized user acceptance notification is conveyed to the requesting user and the process ends at 516. While "control" is the verb used in the description of the invention, it should be noted that it is intended that "control" to mean any type of WebSphere Portal, including Starting and Stopping the WebSphere Portal.

It should be understood that the present invention is typically computer-implemented via hardware and/or software. As such, client systems and/or servers will include computerized components as known in the art. Such components typically include (among others) a processing unit, a memory, a bus, input/output (I/O) interfaces, external devices, etc.

While shown and described herein as a system and method for controlling a WebSphere Portal, it is understood that the invention further provides various alternative embodiments. For example, in one embodiment, the invention provides a computer-readable/useable medium that includes computer program code to enable a computer infrastructure to allow for the control a WebSphere Portal. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory and/or storage system (e.g., a fixed disk, a read-only memory, a random access memory, a cache memory, etc.), and/or as a data signal (e.g., a propagated signal) traveling over a network (e.g., during a wired/wireless electronic distribution of the program code).

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method, in a Java application executing on a computer device, the Java application having Java application code which has a Java code interface, for receiving control requests from requesting users and determining whether the requesting users are authorized to control a portal, the portal having portal control application code which has a portal control code interface, the method comprising the steps of:
   a. receiving, on the computer device at the Java code interface, a request to control the portal;
   b. parsing, on the computer device by the Java application, the portal control request for obtaining the requesting user identification (ID) and associated password (PW);
   c. comparing, on the computer device by the Java application, the requesting user ID and PW with a list which are authorized to control the portal;
   d. determining whether the requesting user ID and associated PW match any of the user IDs and associated PWs in the list of authorized user IDs and associated PWs;
   e. if not, skipping to step g;
   f. if so, conveying the authorized user ID and PW to the Java code interface and conveying the authorized user ID and PW, from the Java code interface, to the Java application as an authorized requesting user; and
   g. ending the method.

2. The method of claim 1 wherein the portal is a WebSphere portal.

3. The method of claim 2 wherein the request to control the portal is a "start" request.

4. The method of claim 2 wherein the request to control the portal is a "stop" request.

5. The method of claim 2 wherein step e, prior to the skipping to the step g step, further comprises the step of conveying to the requesting user an unauthorized user rejection notification.

6. The method of claim 2 wherein step f further comprises the step of conveying to the requesting user an authorized user acceptance notification performed concurrently with the steps of conveying the authorized user ID and PW to the Java code interface and conveying the authorized user ID and PW, from the Java code interface, to the Java application as an authorized requesting user.

7. A computer program product comprising a non-transitory computer usable medium including computer usable program code comprising Java application code which has a Java code interface for implementing a method for receiving control requests from requesting users and determining whether the requesting users are authorized to control a portal, the portal having portal control application code which has a portal control code interface, the method comprising the steps of:
   a. at the Java code interface, receiving a request to control the portal;
   b. parsing, by the Java application, the portal control request for obtaining the requesting user identification (ID) and associated password (PW);
   c. comparing, by the Java application, the requesting user ID and PW with a list which are authorized to control the portal;
   d. determining whether the requesting user ID and associated PW match any of the user IDs and associated PWs in the list of authorized user IDs and associated PWs;
   e. if not, skipping to step g;
   f. if so, conveying the authorized user ID and PW to the Java code interface and conveying the authorized user ID and PW, from the Java code interface, to the Java application as an authorized requesting user; and
   g. ending the method.

8. The computer program product of claim 7 wherein the portal is a WebSphere portal.

9. The computer program product of claim 8 wherein the request to control the portal is a "start" request.

10. The computer program product of claim 8 wherein the request to control the portal is a "stop" request.

11. The computer program product of claim 8 wherein, in the method, step e, prior to the skipping to the step g step, further comprises the step of conveying to the requesting user an unauthorized user rejection notification.

12. The computer program product of claim 8 wherein, in the method, step f further comprises the step of conveying to the requesting user an authorized user acceptance notification performed concurrently with the steps of conveying the authorized user ID and PW to the Java code interface and conveying the authorized user ID and PW, from the Java code interface, to the Java application as an authorized requesting user.

13. A system for receiving control requests from requesting users and determining whether the requesting users are authorized to control a portal, the portal having portal control application code which has a portal control code interface, the system comprising at least one computer device, having a Java application having Java application code and a Java code interface, the Java application code having a table having list of authorized user identifications (IDs) and associated passwords (PWs), the Java code interface having code for receiving control requests from requesting users from a portal control request channel, for parsing those requests to obtain the requesting user IDs and PWs and for passing to the Java application code, the Java application code having code for comparing those requesting user IDs and PWs with the list of authorized user IDs and associated PWs in the table and for passing the requesting user ID and PW to the portal control application code and the portal control code interface via an authorized user portal control request channel if it matches an authorized user ID and associated PW in the table.

14. The system of claim 13 wherein the portal is a WebSphere Portal.

15. The system of claim 14 wherein the Java application code further has code for conveying a portal control request authorized user acceptance to the requesting user if there is a match.

16. The system of claim 15 wherein the portal control request authorized user acceptance is conveyed to the requesting user via the portal control request response channel.

17. The system of claim 14 wherein the Java application code further has code for conveying a portal control request unauthorized user rejection to the requesting user if there is no match.

18. The system of claim 17 wherein the portal control request unauthorized user rejection is conveyed to the requesting user via the portal control request response channel.

* * * * *